(12) United States Patent
Senda (10) Patent No.: US 9,269,303 B2
(45) Date of Patent: Feb. 23, 2016

(54) ORGANIC LIGHT EMITTING DISPLAY DEVICE AND METHOD OF DRIVING THE SAME

(71) Applicant: SAMSUNG DISPLAY CO., LTD., Yongin, Gyeonggi-Do (KR)

(72) Inventor: Takahiro Senda, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 24 days.

(21) Appl. No.: 14/214,586

(22) Filed: Mar. 14, 2014

(65) Prior Publication Data

US 2014/0306946 A1 Oct. 16, 2014

(30) Foreign Application Priority Data

Apr. 12, 2013 (KR) .................. 10-2013-0040182

(51) Int. Cl.
- *G09G 3/32* (2006.01)
- *H04N 13/04* (2006.01)
- *G09G 3/00* (2006.01)

(52) U.S. Cl.
CPC .............. *G09G 3/3258* (2013.01); *G09G 3/003* (2013.01); *G09G 3/3233* (2013.01); *H04N 13/0438* (2013.01); *G09G 2300/0819* (2013.01); *G09G 2300/0852* (2013.01); *G09G 2300/0861* (2013.01); *G09G 2310/0218* (2013.01); *G09G 2320/0261* (2013.01)

(58) Field of Classification Search
CPC ................... G09G 3/3258; G09G 2300/0819; G09G 2300/0852; G09G 2300/0861; G09G 2310/0218; G09G 2320/0261; G09G 3/003; G09G 3/3233; H04N 13/0438

USPC ............................. 345/76, 204–214, 690–699
See application file for complete search history.

(56) References Cited

U.S. PATENT DOCUMENTS

| | | | |
|---|---|---|---|
| 2008/0169754 A1* | 7/2008 | Yang et al. ..................... | 313/504 |
| 2011/0025671 A1 | 2/2011 | Lee | |
| 2011/0227505 A1* | 9/2011 | Park et al. ..................... | 315/297 |
| 2012/0007848 A1 | 1/2012 | Han et al. | |
| 2012/0139890 A1* | 6/2012 | Choi ............................. | 345/212 |
| 2012/0293496 A1* | 11/2012 | Park et al. ..................... | 345/419 |
| 2012/0306939 A1* | 12/2012 | Choi et al. ..................... | 345/690 |
| 2014/0111563 A1* | 4/2014 | Hwang ................ | G09G 3/3233 345/691 |
| 2014/0132583 A1* | 5/2014 | Kim ............................. | 345/212 |
| 2014/0192037 A1* | 7/2014 | Chung .......................... | 345/212 |
| 2015/0062195 A1* | 3/2015 | Kumeta et al. ................ | 345/690 |

FOREIGN PATENT DOCUMENTS

| | | |
|---|---|---|
| KR | 10-2011-0013693 | 2/2011 |
| KR | 10-2011-0136775 | 12/2011 |
| KR | 10-2012-0004149 | 1/2012 |

* cited by examiner

*Primary Examiner* — Dmitriy Bolotin
(74) *Attorney, Agent, or Firm* — Christie, Parker & Hale, LLP (57) ABSTRACT

A method of driving an organic light emitting display device includes compensating threshold voltages of driving transistors included in respective pixels while concurrently supplying scan signals to scan lines, lowering voltages of gate electrodes of the driving transistors and equalizing voltages of first electrodes and second electrodes of the driving transistors after the compensating of the threshold voltages, transmitting data signals to the pixels while progressively supplying the scan signals to the scan lines, and emitting light concurrently from the pixels in response to gray levels of the data signals.

12 Claims, 9 Drawing Sheets

ORGANIC LIGHT EMITTING DISPLAY DEVICE AND METHOD OF DRIVING THE SAME

CROSS-REFERENCE TO RELATED APPLICATION

This application claims priority to and the benefit of Korean Patent Application No. 10-2013-0040182, filed on Apr. 12, 2013 in the Korean Intellectual Property Office, the entire content of which is incorporated herein by reference.

BACKGROUND

1. Field

Aspects of embodiments of the present invention relate to an organic light emitting display device and a method of driving the organic light emitting display device.

2. Description of the Related Art

Recently, various flat panel displays (FPDs) capable of reducing weight and volume compared to those of cathode ray tube (CRT) devices have been developed. The FPDs include liquid crystal displays (LCDs), field emission displays (FEDs), plasma display panels (PDPs), and organic light emitting display devices.

Among the FPDs, the organic light emitting display devices display images using organic light emitting diodes (OLEDs) that generate light by re-combination of electrons and holes. Organic light emitting display devices have high response speed and are driven with low power consumption.

SUMMARY

Embodiments of the present invention are directed to organic light emitting display devices and methods of driving the organic light emitting display devices. Further embodiments are directed to organic light emitting display devices capable of displaying images with consistent light emission of pixels being driven with the same gray level and consistent contrast between pixels being driven with different gray levels.

In an embodiment of the present invention, an organic light emitting display device is provided. The organic light emitting display device includes a scan driver configured to supply scan signals to scan lines concurrently during a first period of a single frame and progressively during a second period of the single frame, a data driver configured to supply data signals to data lines in synchronization with the scan signals progressively supplied to the scan lines during the second period, pixels coupled to the scan lines and the data lines, a first voltage driver configured to supply a first voltage varying between a low-level first voltage and a high-level first voltage to the pixels during the single frame, and a second voltage driver configured to supply a second voltage varying between a low-level second voltage and a high-level second voltage to the pixels during the single frame. The first period is divided into an initialization period, a threshold voltage compensation period, and a stabilization period. The data driver is configured to supply a first initialization voltage to the data lines for some of the initialization period, a reference voltage that is higher than the first initialization voltage to the data lines during the threshold voltage compensation period, and a second initialization voltage that is lower than the reference voltage to the data lines for some of the stabilization period.

The first voltage driver may be further configured to supply the low-level first voltage during the initialization period and to supply the high-level first voltage during the threshold voltage compensation period, the stabilization period, and the second period.

The second voltage driver may be further configured to supply the low-level second voltage during a third period of the single frame and the high-level second voltage during the first period and the second period.

The first initialization voltage may be a voltage that turns on a driving transistor included in each of the pixels.

The second initialization voltage may be a voltage corresponding to one of the data signals of a maximum gray level.

The organic light emitting display device may further include a control line driver configured to supply a control signal to control lines for some of the threshold voltage compensation period, the control lines being commonly coupled to the pixels.

Each of the pixels may include: an organic light emitting diode (OLED); a driving transistor configured to control an amount of current to supply to the OLED; a second capacitor including a first terminal coupled to a gate electrode of the driving transistor; a first transistor coupled between a second terminal of the second capacitor and a corresponding one of the data lines, and configured to turn on when a corresponding one of the scan signals is supplied to a corresponding one of the scan lines during the second period; a third transistor coupled between an anode electrode of the OLED and the gate electrode of the driving transistor, and configured to turn on when the control signal is supplied to a corresponding one of the control lines; and a first capacitor coupled between the second terminal of the second capacitor and the first voltage driver.

In another embodiment of the present invention, an organic light emitting display device is provided. The, organic light emitting display device includes a scan driver configured to supply scan signals to scan lines concurrently during a first period of a single frame and progressively during a second period of the single frame, a data driver configured to supply data signals to data lines in synchronization with the scan signals progressively supplied to the scan lines during the second period, pixels coupled to the scan lines and the data lines, a first voltage driver configured to supply a first voltage varying between a low-level first voltage and a high-level first voltage to the pixels during the single frame, a second voltage driver configured to supply a second voltage varying between a low-level second voltage and a high-level second voltage to the pixels during the single frame, and a switching unit coupled to the data lines. The first period is divided into an initialization period, a threshold voltage compensation period, and a stabilization period. The switching unit is configured to supply at least one of a first initialization voltage to the data lines for some of the initialization period, a reference voltage that is higher than the first initialization voltage to the data lines during the threshold voltage compensation period, or a second initialization voltage that is lower than the reference voltage to the data lines for some of the stabilization period.

The switching unit may be further configured to supply the first initialization voltage, the second initialization voltage, and the reference voltage to the data lines.

The switching unit may include a first switch coupled between the data lines and the first initialization voltage, a second switch coupled between the data lines and the reference voltage, and a third switch coupled between the data lines and the second initialization voltage.

In yet another embodiment of the present invention, a method of driving an organic light emitting display device is provided. The method includes compensating threshold voltages of driving transistors included in respective pixels while concurrently supplying scan signals to scan lines, lowering voltages of gate electrodes of the driving transistors and equalizing voltages of first electrodes and second electrodes of the driving transistors after the compensating of the threshold voltages, transmitting data signals to the pixels while progressively supplying the scan signals to the scan lines, and emitting light concurrently from the pixels in response to gray levels of the data signals.

The equalizing of the voltages may include supplying an initialization voltage to data lines to lower the voltages of the gate electrodes of the driving transistors.

The initialization voltage may correspond to one of the data signals of a maximum gray level.

BRIEF DESCRIPTION OF THE DRAWINGS

Example embodiments of the present invention are described more fully hereinafter with reference to the accompanying drawings. It should be noted, however, that the present invention may be embodied in different forms and should not be construed as limited to the embodiments set forth herein. Rather, these embodiments are provided to more fully convey the scope of the present invention to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, organic light emitting display devices and methods of driving the organic light emitting display devices according to embodiments of the present invention will be described with reference to the accompanying drawings. Throughout the application, the use of the term "coupled" may mean two elements are directly coupled (e.g., connected) or indirectly coupled (e.g., electrically connected) through one or more intermediate elements. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Figure 1:
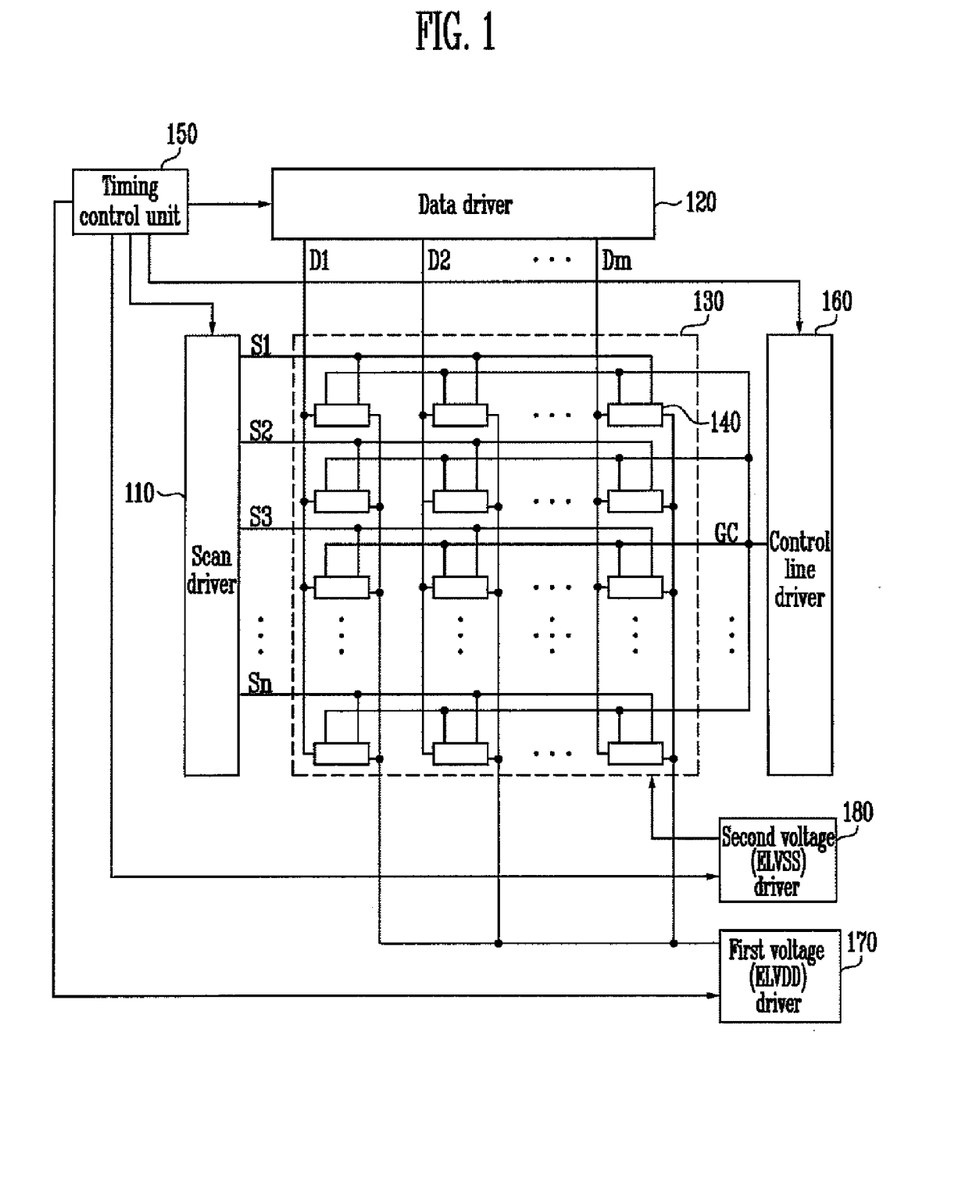
FIG. 1 is a schematic view illustrating an organic light emitting display device according to an embodiment of the present invention.

FIG. 1 is a schematic view illustrating an organic light emitting display device according to an embodiment of the present invention.

Referring to FIG. 1, the organic light emitting display device includes a display unit 130 including pixels 140 coupled to scan lines S1 to Sn and data lines D1 to Dm, a scan driver 110 for supplying scan signals to the scan lines S1 to Sn, a control line driver 160 for supplying a control signal to a control line (or control lines) GC commonly coupled to the pixels 140, a data driver 120 for supplying data signals to the data lines D1 to Dm, and a timing controller 150 for controlling the scan driver 110, the data driver 120, and the control line driver 160. In addition, the organic light emitting display device further includes a first voltage driver 170 for supplying a first voltage ELVDD to the pixels 140 and a second voltage driver 180 for supplying a second voltage ELVSS to the pixels 140.

The scan driver 110 supplies the scan signals to the scan lines S1 to Sn. For example, the scan driver 110 may supply the scan signals to the scan lines S1 to Sn concurrently (e.g., simultaneously) or progressively (e.g. sequentially) for different periods of a single frame.

The data driver 120 supplies the data signals to the data lines D1 to Dm in synchronization with the scan signals that are progressively supplied to the scan lines S1 to Sn during a scan period. The data driver 120 supplies a first initialization voltage Vint1 and a second initialization voltage Vint2 to overlap with scan signals that are concurrently (e.g., simultaneously) supplied to the scan lines S1 to Sn during an initialization period and a stabilization period. The data driver 120 supplies a reference voltage Vref to the data lines D1 to Dm for periods when the data signals, the first initialization voltage Vint1, or the second initialization voltage Vint2 are not supplied.

The control line driver 160 supplies a control signal to the control line GC. For example, the control line driver 160 may supply the control signal to the control line GC to overlap with scan signals that are simultaneously supplied to the scan lines S1 to Sn during the threshold voltage compensation period, and not to overlap with the first initialization voltage Vint1 or the second initialization voltage Vint2.

The display unit 130 includes the pixels 140 positioned at crossing regions of the scan lines S1 to Sn and the data lines D1 to Dm. The pixels 140 are supplied with the first voltage ELVDD from the first voltage driver 170 and the second voltage ELVSS from the second voltage driver 180. These pixels 140 control the amount of current flowing from the first voltage (ELVDD) driver 170 to the second voltage (ELVSS) driver 180 via organic light emitting diodes (OLEDs) corresponding to the data signals during a light emitting period of a single frame. Then, the OLEDs emit light with a set brightness (for example, a predetermined brightness).

The first voltage driver 170 supplies the first voltage ELVDD to the pixels 140. In one embodiment, the first voltage ELVDD alternates between a high level ELVDD(H) and a low level ELVDD(L) for each frame. For example, the high level ELVDD(H) of the first voltage ELVDD may be a voltage sufficiently high to allow normal current to flow through the pixels 140 while the low level ELVDD(L) may be a voltage sufficiently low to prevent normal current from flowing through the pixels 140.

The second voltage driver 180 supplies the second voltage ELVSS to the pixels 140. In one embodiment, the second voltage ELVSS alternates between a high level ELVSS(H) and a low level ELVSS(L) for each frame. For example, the high level ELVSS(H) of the second voltage ELVSS may be a voltage sufficiently high to prevent normal current from flowing through the pixels 140 while the low level ELVSS(L) thereof may be a voltage sufficiently low to allow normal current to flow through the pixels 140. Accordingly, the pixels 140 emit light during the light emitting period when the first voltage ELVDD is set to the high level ELVDD(H) and the second voltage ELVSS is set to the low level ELVSS(L) for each frame, and the pixels 140 do not emit light when the first voltage ELVDD is set to the low level ELVDD(L) or the second voltage ELVSS is set to the high level ELVSS(H).

Figure 2:
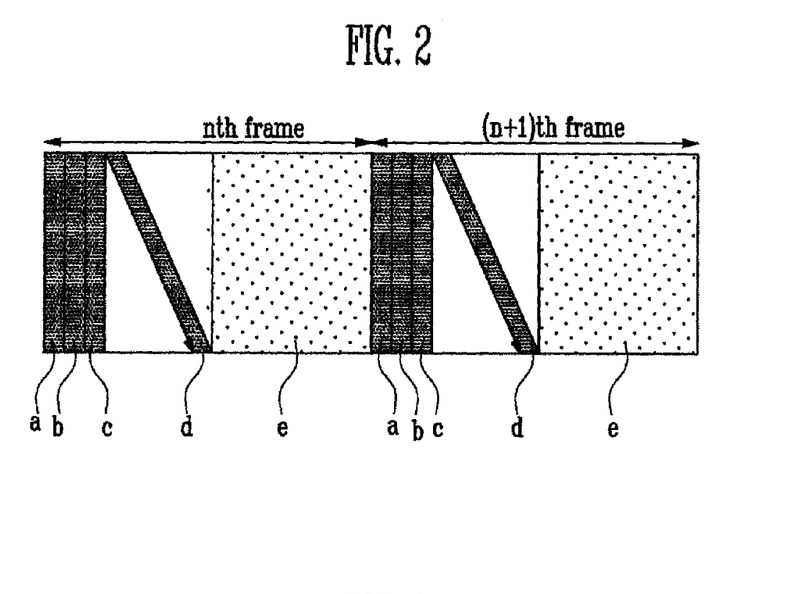
FIG. 2 is a two-dimensional (2D) timeline view illustrating a driving method of an organic light emitting display device using simultaneous emission according to an embodiment of the present invention.

FIG. 2 is a two-dimensional (2D) timeline view illustrating a driving method of an organic light emitting display device using simultaneous emission (or concurrent emission) according to an embodiment of the present invention.

Referring to FIG. 2, the organic light emitting display device is driven in a simultaneous light emission manner. In general, the driving method may be classified into a progressive emission or a simultaneous emission method. Progressive emission means generally that the scan signals are progressively (for example, sequentially) input to the respective scan lines S1 to Sn (while data signals are synchronously delivered through the data lines D1 to Dm to the pixels 140) and the pixels 140 progressively emit light by a horizontal line unit in the same order as the scan signal (or data) input order. The pixels 140 may also progressively stop emitting light by the horizontal line unit in this same order.

By contrast, concurrent or simultaneous emission means generally that the scan signals are progressively input to the respective scan lines S1 to Sn (while data signals are synchronously delivered through the data lines D1 to Dm to the pixels 140), but the pixels 140 wait to emit light concurrently (for example, simultaneously) after the scan signals have been input (or the data has been input to all the pixels 140). A single frame of the two frames illustrated in FIG. 2 is driven by simultaneous emission and is divided into (a) an initialization period, (b) a threshold voltage compensation period, (c) a stabilization (or stabilizing) period, (d) a scan period, and (e) an emission (or light emitting) period. Here, the pixels 140 are driven progressively scan line by scan line during (d) the scan period while all the pixels 140 are simultaneously driven during the remaining periods including (a) the initialization period, (b) the threshold voltage compensation period, (c) the stabilization period, and (e) the emission period.

The initialization period is for initializing a voltage of anode electrodes of OLEDs respectively included in the pixels 140 to a voltage of a low level, such as the low-level voltage ELVDD(L) of the first voltage ELVDD. As a result, the OLEDs supplied with this low-level voltage do not emit light.

The threshold compensation period is for compensating a threshold voltage of the driving transistors included in the respective pixels 140. During the threshold voltage compensation period, a voltage corresponding to the threshold voltage of the driving transistors is charged in second capacitors (see FIG. 5) included in the respective pixels 140.

The stabilization period is for increasing a voltage of drain electrodes of the driving transistors (that are coupled to the anode electrodes of the OLEDs) to a high-level voltage ELVDD(H) of the first voltage ELVDD. During the stabilization period, uneven images (for example, different brightness when displaying the same gray level or inconsistent contrast when displaying different gray levels) are prevented from being displayed. These uneven images may be due to factors such as the leakage current of the driving transistors and a voltage difference of the data signals. Details of the stabilization period will be described later.

The scan period is for supplying the data signals to the respective pixels 140. During the scan period, voltages corresponding to the data signals are charged to the first capacitors (see FIG. 5) respectively included in the pixels 140. The light emitting period is for emitting light from the pixels 140 in response to the data signals supplied during the scan period.

Since the respective operation periods (a) to (e) are clearly divided in a visible manner in the driving method of FIG. 2, the number of transistors included in the respective pixels 140 and the number of signals for controlling the transistors can be reduced. In addition, since the operation periods (a) to (e) are clearly divided in a visible manner, a 3D display using an organic light emitting display together with shutter glasses can be easily implemented.

The 3D display with shutter glasses outputs a left-eye image and right-eye image for each frame alternately. A user wears the shutter glasses in which transmittance of left eye/right eye are switched (alternated) between 0% and 100%. The shutter glasses provide the left-eye image to the left eye and the right-eye image to the right eye so that a user sees a three-dimensional image.

Figure 3:
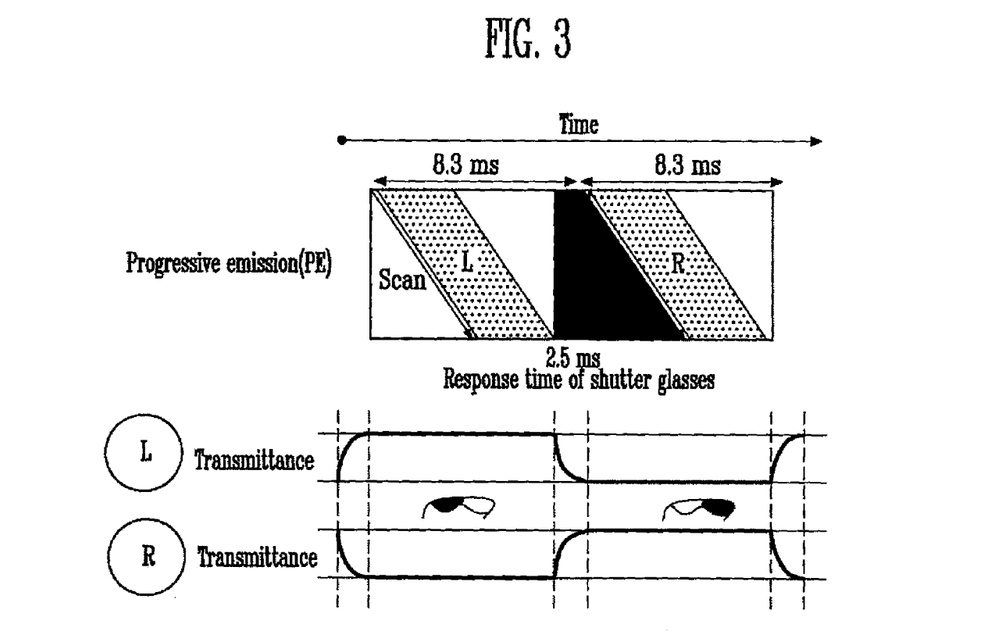
FIG. 3 is a view illustrating an example driving method of a three-dimensional (3D) image with an organic light emitting display device and shutter glasses by progressive emission.

FIG. 3 is a view illustrating an example driving method of a three-dimensional (3D) image with an organic light emitting display device and shutter glasses by progressive emission.

Referring to FIG. 3, when an image is outputted with progressive emission, the emission of the shutter glasses should be switched off for as long as a response time (for example, 2.5 ms) of the shutter glasses to prevent cross talk occurring between the left-eye image and the right-eye image. That is, a non-emission period is further created between an i-th frame (i is a natural number) when the left-eye image is outputted and an (i+1)-th frame when the right-eye image is outputted, and this non-emission period may be as long as the response time of the shutter glasses, resulting in a low duty ratio.

Figure 4:
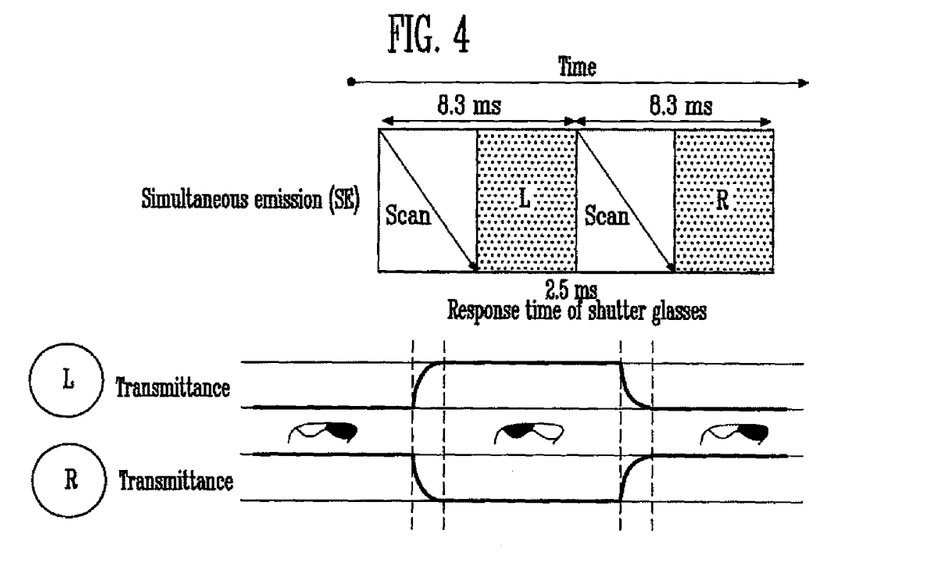
FIG. 4 is a view illustrating an example driving method of a 3D image with an organic light emitting display device and shutter glasses by simultaneous emission according to an embodiment of the present invention.

FIG. 4 is a view illustrating an example driving method of a 3D image with an organic light emitting display device and shutter glasses by simultaneous emission according to an embodiment of the present invention.

Referring to FIG. 4, light is emitted from the entire display unit 130 simultaneously during the light emitting periods when an image is outputted with simultaneous emission, and the pixels do not emit light during the remaining periods. Therefore, the non-emission periods naturally take place between the periods when the left-eye image is outputted and the periods when the right-eye image is outputted.

That is, the pixels 140 do not emit light during a reset period (e.g., the initialization period or the stabilization period), the threshold voltage compensation period, and the scan period between emission periods of the i-th frame and the (i+1)th frame. Accordingly, there is no reduction in the duty ratio when these non-emission periods are in synchronization with the response time of the shutter glasses, which is different from existing progressive emission techniques.

Figure 5:
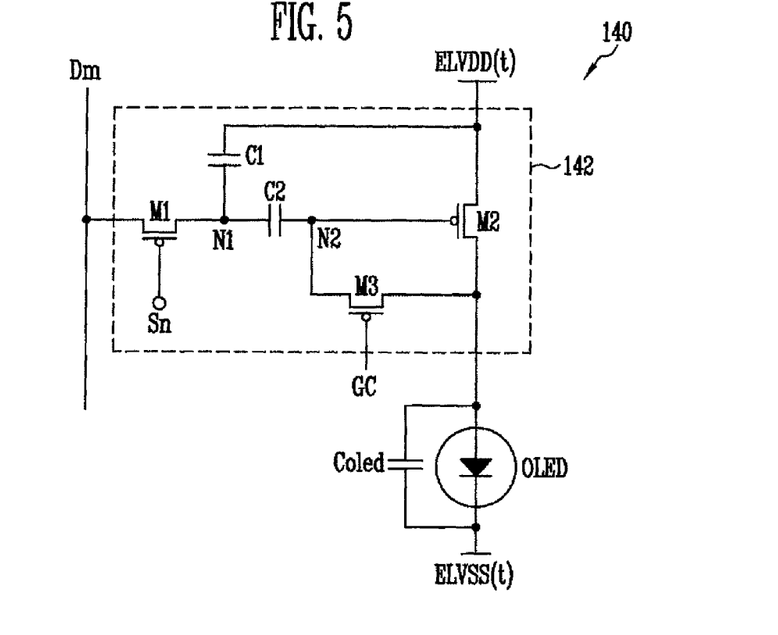
FIG. 5 is a circuit diagram illustrating an embodiment of a pixel of FIG. 1.

FIG. 5 is a circuit diagram illustrating an embodiment of a pixel 140 of FIG. 1. For illustrative purposes, FIG. 5 shows the pixel 140 coupled to an n-th scan line Sn and an m-th data line Dm. An organic capacitor Coled is shown in FIG. 5 to denote a capacitance parasitically formed on an organic light emitting diode (OLED) of the pixel 140. The organic capacitor Coled may have a capacity (e.g., capacitance) higher than a first capacitor C1 (or a second capacitor C2) included in a pixel circuit 142 of the pixel 140.

Referring to FIG. 5, the pixel 140 includes the OLED for emitting light and the pixel circuit 142 for controlling the amount of current to supply to the OLED. An anode electrode of the OLED is coupled to the pixel circuit 142 while a cathode electrode thereof is coupled to a source of the second voltage ELVSS (for example, the second voltage driver 180 of FIG. 1). The OLED emits light with a set brightness (for example, a predetermined brightness) in response to the current supplied from the pixel circuit 142.

The pixel circuit 142 charges a voltage corresponding to one of the data signals and the threshold voltage of the driving transistor, and controls the amount of current to supply to the OLED in response to the charged voltage. To this end, the pixel circuit 142 includes only three transistors M1 to M3 and two capacitors C1 and C2.

A gate electrode of the first transistor M1 is coupled to the scan line Sn while a first electrode thereof is coupled to the data line Dm. The second electrode of the first transistor M1 is coupled to a first node N1. The first transistor M1 is turned on to connect the data line Dm to the first node N1 when the scan signal is supplied to the scan line Sn.

A gate electrode of the second transistor M2 (driving transistor) is coupled to a second node N2 while a first electrode thereof is coupled to a source of the first voltage ELVDD (e.g., the first voltage driver 170 of FIG. 1). A second electrode of the second transistor M2 is coupled to the anode electrode of the OLED. The second transistor M2 controls the amount of current supplied to the OLED in response to the voltage applied to the second node N2.

A first electrode of the third transistor M3 is coupled to the second electrode of the second transistor M2 while a second electrode thereof is coupled to the second node N2. A gate electrode of the third transistor M3 is coupled to the control line GC (or an nth control line commonly coupled to the other control lines). The third transistor M3 is turned on to connect the second transistor M2 as a diode when the control signal is supplied to the control line GC.

The first capacitor C1 is coupled between the first node N1 and the source of the first voltage ELVDD (e.g., has one terminal coupled to the first node N1 and another terminal coupled to the source of the first voltage ELVDD). The first capacitor C1 charges a voltage corresponding to the data signal.

The second capacitor C2 is coupled between the first node N1 and the second node N2 (e.g., has one terminal coupled to the first node N1 and another terminal coupled to the second node N2). The second capacitor C2 charges a voltage corresponding to the threshold voltage of the second transistor M2.

Figure 6:
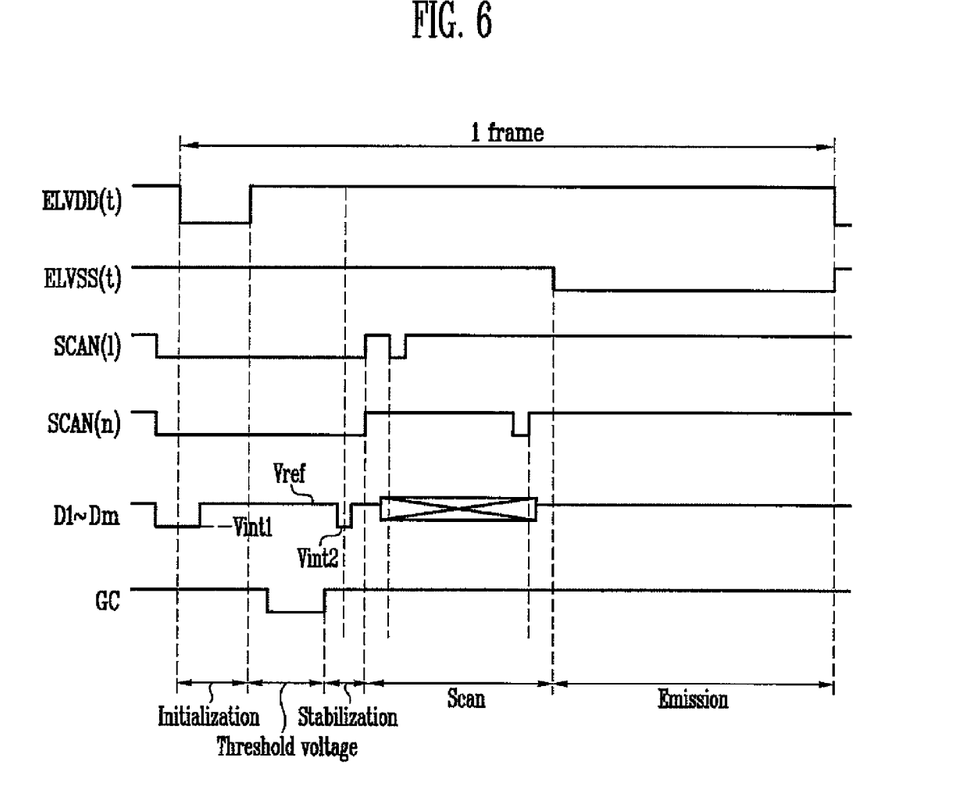
FIG. 6 is a waveform diagram illustrating driving waveforms of the pixel of FIG. 5 according to an embodiment of the present invention.

FIG. 6 is a waveform diagram illustrating driving waveforms of the pixel 140 of FIG. 5 according to an embodiment of the present invention. The first voltage ELVDD is set to a low level ELVDD(L) during the initialization period and to a high level ELVDD(H) during the remaining periods. The second voltage ELVSS is set to the high level ELVSS(H) during the initialization period, the threshold voltage compensation period, the stabilization period, and the scan period, and to the low level ELVSS(L) during the light emitting period. Here, the pixel 140 emits light of a set brightness (for example, a predetermined brightness) only when the first voltage ELVDD is set to the high level ELVDD(H) and the second voltage ELVSS is set to the low level ELVSS(L), that is, during the light emitting period.

Referring to FIG. 6, the scan signal is supplied to the scan lines S1 to Sn simultaneously during the initialization period, the threshold voltage compensation period, and the stabilization period. A first initialization voltage Vint1 is supplied to the data lines D1 to Dm for some of the initialization period.

When the scan signal is supplied to the scan lines S1 to Sn during the initialization period, the first transistors M1 included in the respective pixels 140 are turned on. When the first transistors M1 are turned on, the first nodes N1 and the respective data lines D1 to Dm are electrically connected. The first initialization voltage Vint1 that is supplied to the data lines D1 to Dm is then supplied to the first nodes N1. When the first initialization voltage Vint1 is supplied to the first nodes N1, the voltage of the second nodes N2 drop down due to the coupling of the second capacitors C2.

When the voltage of the second nodes N2 drop down, the second transistors M2 are turned on and then the voltage of the first voltage ELVDD(L) with the low level is supplied to the anode electrodes of the OLEDs. That is, the anode electrodes of the OLEDs are initialized by the voltage of the first voltage ELVDD(L) of the low level during the initialization period. The voltage level of the first initialization voltage Vint1 may be determined (for example, by routine experimentation) by one of ordinary skill in the art such that the second transistors M2 may be stably turned on.

For ease of description, the remaining description of FIG. 6 will be from the perspective of the pixel 140 driven by the n-th scan line Sn and m-th data line Dm. After initialization period, the control signal is supplied to the control line GC during the threshold voltage compensation period. When the control signal is supplied through the control line GC, the third transistor M3 is turned on. When the third transistor M3 is turned on, the second transistor M2 is coupled as a diode and the second transistor M2 is turned on in response to the low-level first voltage ELVDD(L) supplied during the initialization period.

When the second transistor M2 is turned on, the voltage at the second node N2 and the second electrode of the second transistor M2 increases up to a voltage the sum of the voltage of the first voltage ELVDD(H) of the high level and the threshold voltage Vth M2 of the second transistor M2, that is, a voltage of ELVDD(H)+Vth M2, where Vth M2 is a negative voltage. Accordingly, the voltage at the second node N2 and at the second electrode of the second transistor M2 is a voltage lower than the first voltage ELVDD(H) of the high level.

During the threshold voltage compensation period, a reference voltage Vref higher than the first initialization voltage Vint1 is supplied to the data lines D1 to Dm. Thus, the second capacitor C2 charges a voltage corresponding to a difference between the reference voltage Vref applied to the first node N1 the voltage ELVDD(H)+Vth M2 being applied to the second node N2 during the threshold voltage compensation period. Here, since the reference voltage Vref and the high-level first voltage ELVDD(H) are fixed voltages, the voltage stored in the second capacitor C2 varies in response to the threshold voltage Vth M2 of the second transistor M2. That is, the second capacitor C2 is charged with a voltage corresponding to the threshold voltage Vth M2 of the second transistor M2 during the threshold voltage compensation period.

A second initialization voltage Vint2 is supplied to the data lines D1 to Dm for some of the stabilization period. The second initialization voltage Vint2 supplied to the data lines D1 to Dm is supplied to the first node N1. Here, the voltage of the second initialization voltage Vint2 is lower than that of the reference voltage Vref so that the voltage of the first node N1 drops down. For example, the voltage of the second initialization voltage Vint2 may be a voltage of a data signal corresponding to the maximum gray level (for example, white).

Figure 8:
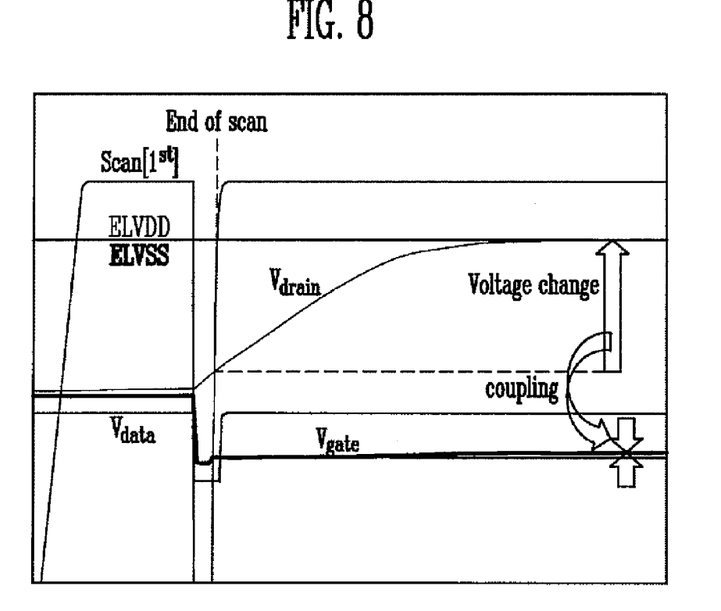
FIG. 8 is a waveform diagram illustrating a voltage change of a second electrode of the driving transistor when a data signal of a low gray level (high data voltage) is supplied to the pixel of FIG. 5 without a stabilization period.

When the voltage of the first node N1 drops down, the voltage of the second node N2 also drops down due to the coupling of the second capacitor C2. When the voltage of the second node N2 drops down, the second transistor M2 turns on so that the voltage of the second electrode (that is, the drain electrode) of the second transistor M2 increases from the voltage of ELVDD(H)+Vth M2 to the voltage of the high-level first voltage ELVDD(H), which can cause a (unintended) corresponding increase in the voltage of the second node N2 (as illustrated in FIG. 8). As such, when the voltages of the first electrode and the second electrode of the second transistor M2 are made the same voltage, namely the high-level first voltage ELVDD(H), changes in the voltage of the second node N2 (from the intended gray level to that of a different gray level) due to the leakage current of the driving transistor M2 can be prevented. Further details of this voltage equalization will be described later.

The scan signals are progressively applied to the scan lines S1 to Sn during the scan period while the data signals are supplied to the data lines D1 to Dm in synchronization with the scan signals. When the scan signal is supplied to the scan line Sn, the first transistor M1 is turned on. When the first transistor M1 is turned on, the data signal is supplied from the data line Dm. At this time, the first capacitor C1 charges a set voltage (for example, a predetermined voltage) in response to the data signal. In addition, the second node N2 floats during the scan period and then the second capacitor C2 maintains the voltage charged during the previous period regardless of the voltage change of the first node N1.

The low-level second voltage ELVSS(L) is supplied during the light emitting period. The second transistor M2 controls the amount of current flowing to the OLED in response to the voltages charged in the first capacitor C1 and the second capacitor C2. Thus, the display unit 130 displays an image of a set brightness (for example, a predetermined brightness) corresponding to the data signals during the light emitting period.

According to the above-described embodiment, the voltage of the second electrode of the second transistor M2 is increased to the voltage of the first electrode, that is, the voltage of the first voltage ELVDD(H) of the high level. Then, the voltage of the second nodes N2 included in the respective pixels 140 can be prevented from being changed due to the leakage current (the amount of change of which varies with the voltage difference of the data signals), so that an image with a desired brightness can be displayed. In embodiments of the present invention, the stabilization period is combined with simultaneous emission and this technical feature can be applied to various pixels including the driving transistor M2, the first and second capacitors C1 and C2, and the third transistor M3.

Figure 7:
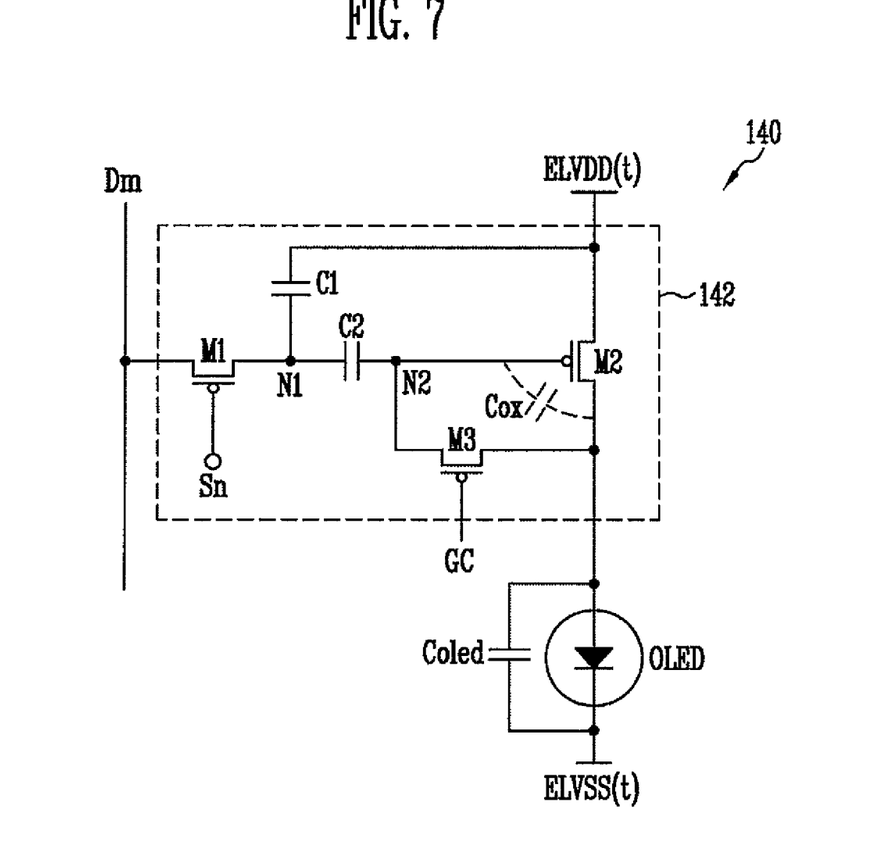
FIG. 7 is a circuit diagram illustrating a parasitic capacitance of a driving transistor in the pixel of FIG. 5.

The stabilization period will now be described in further detail. FIG. 7 is a circuit diagram illustrating a parasitic capacitance (as shown by parasitic capacitor Cox) of the driving transistor M2 in the pixel 140 of FIG. 5.

First, as illustrated in FIG. 7, the parasitic capacitor Cox is formed between the gate electrode and the second electrode of the driving transistor M2. When the first transistor M1 is turned on, the voltage change of the second node N2 is determined from a ratio between the second capacitor C2 and the parasitic capacitor Cox. Here, since the second capacitor C2 can be designed to have a capacity much more than that of the parasitic capacitor Cox, the voltage change of the second node N2 due to the parasitic capacitor Cox may be insignificant when the first transistor M1 is turned on.

However, when the first transistor M1 is turned off, the voltage change of the first node N1 is determined by a ratio between the synthesized capacity of the first capacitor C1 and the second capacitor C2, and the capacity of the parasitic capacitor Cox. Here, the synthesized capacity is lower than that of the second capacitor C2 so that the voltage change of the first node N1 due to the parasitic capacitor Cox is large.

In more detail, the voltage ELVDD(H)+Vth M2 of the second electrode of the second transistor M2 is a voltage lower than the voltage ELVDD(H) (high level) of the first electrode after the threshold voltage compensation period. Because of this, a set leakage current (e.g., a predetermined leakage current) occurs in the second transistor M2, the amount of which varies with the voltage of the second node N2.

In addition, the leakage current difference occurs in response to the data signals supplied to the respective pixels 140 during the scan period and the voltages of the second nodes N2 vary due to the leakage current difference. FIG. 8 is a waveform diagram illustrating a voltage change of the second electrode of the driving transistor M2 when a data signal of a low gray level (high data voltage), such as black, is supplied to the pixel 140 of FIG. 5 without a stabilization period. As illustrated in FIG. 8, when a (high voltage) data signal Vdata corresponding to a low gray level is supplied during the scan period, a small amount of leakage current occurs and due to this, the voltage Vdrain of the second electrode of the driving transistor M2 increases slowly. Because of this, the voltage of the second node N2 also increases in response to the leakage current.

Figure 9:
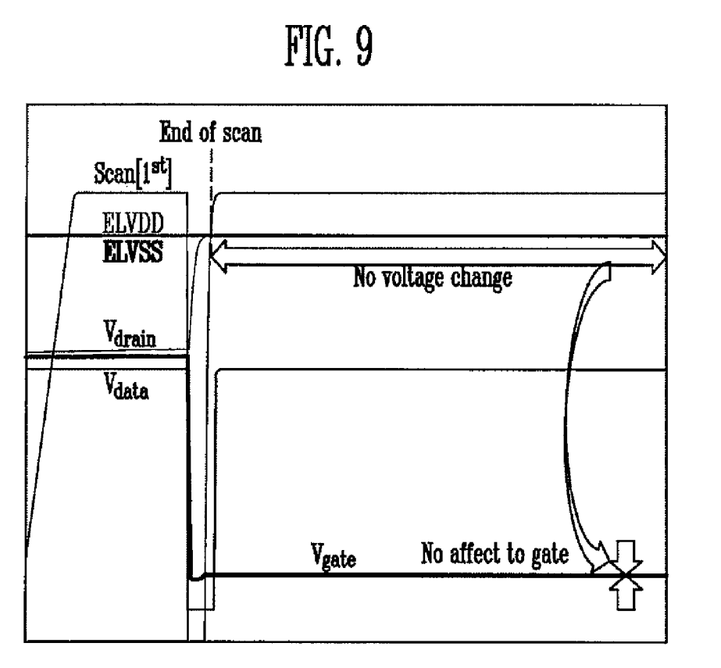
FIG. 9 is a waveform diagram illustrating a voltage change of the second electrode of the driving transistor when a data signal of a high gray level (low data voltage) is supplied to the pixel of FIG. 5 without the stabilization period.

FIG. 9 is a waveform diagram illustrating a voltage change of the second electrode of the driving transistor M2 when a data signal of a high gray level (low data voltage), such as white, is supplied to the pixel 140 of FIG. 5 without the stabilization period. As illustrated in FIG. 9, when a data signal Vdata corresponding to a high gray level is supplied, the voltage Vdrain of the second electrode of the driving transistor M2 increases up to the voltage of the first voltage ELVDD, in this case ELVDD(H), much more quickly than when a low gray level (high data voltage) data signal was provided in FIG. 8, due to the much greater amount of leakage current during the period when the scan signal is supplied. As such, in FIG. 9, when the voltage Vdrain of the second electrode of the driving transistor M2 equalizes to that of the first voltage ELVDD(H) during the period when the scan signal is supplied, the leakage current does not occur after the scan signal period (that is, when such a leakage would cause a corresponding increase in the voltage of the second node N2).

In addition, the voltage Vdrain of the second electrode of the driving transistor M2 varies due to the leakage current caused by the voltage difference between the first electrode and the second electrode of the driving transistor M2 that is generated from the threshold voltage compensation period, regardless of the data signal.

Figure 10:
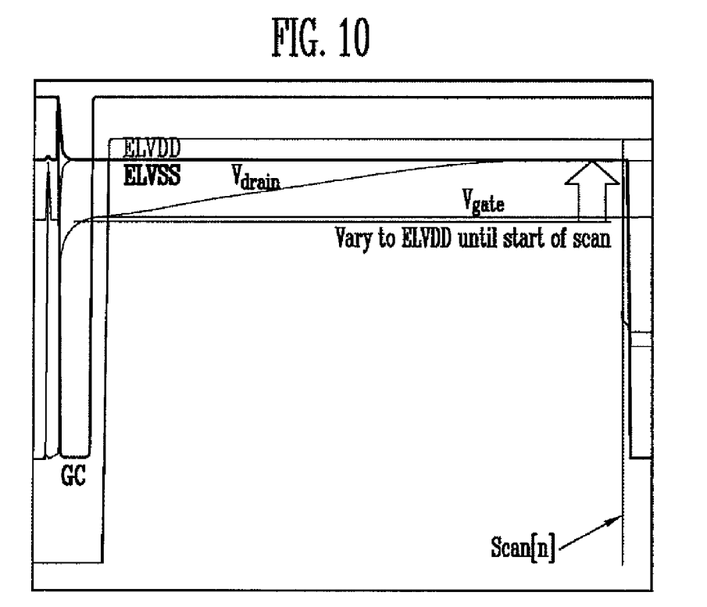
FIG. 10 is a waveform diagram illustrating a voltage change of the second electrode of the driving transistor corresponding to a voltage difference between a first electrode and the second electrode of the driving transistor in the pixel of FIG. 5 during a stabilization period of an embodiment of the present invention.
Figure 11:
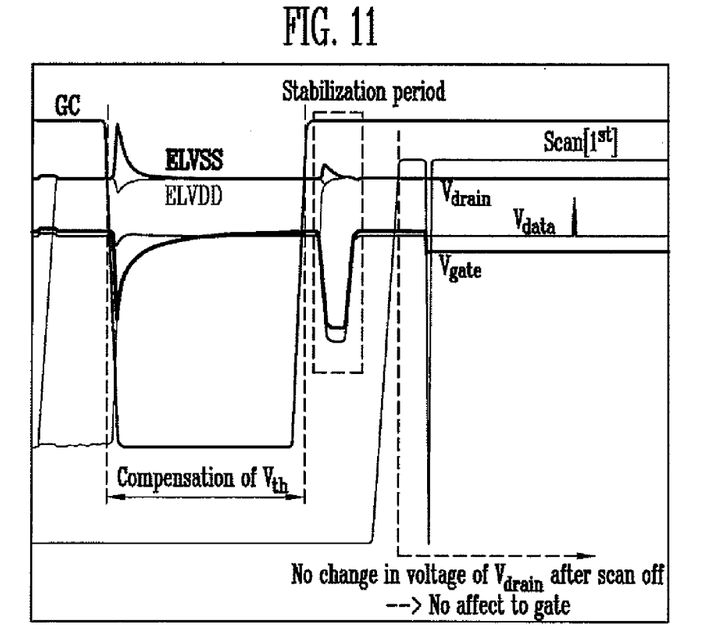
FIG. 11 is a waveform diagram illustrating a voltage change of a gate electrode of the driving transistor in response to the driving waveforms of an embodiment of the present invention.

As described above, when the stabilization period is not included, the leakage current leaves the voltage of the second nodes N2 included in the pixels 140 uneven (for example, with unintended voltages), resulting in displaying of an undesired image. FIG. 10 is a waveform diagram illustrating a voltage change of the second electrode of the driving transistor M2 corresponding to a voltage difference between the first electrode and the second electrode of the driving transistor M2 in the pixel 140 of FIG. 5 during a stabilization period of an embodiment of the present invention. FIG. 11 is a waveform diagram illustrating a voltage change of a gate electrode of the driving transistor M2 in response to the driving waveforms of an embodiment of the present invention.

Figure 12:
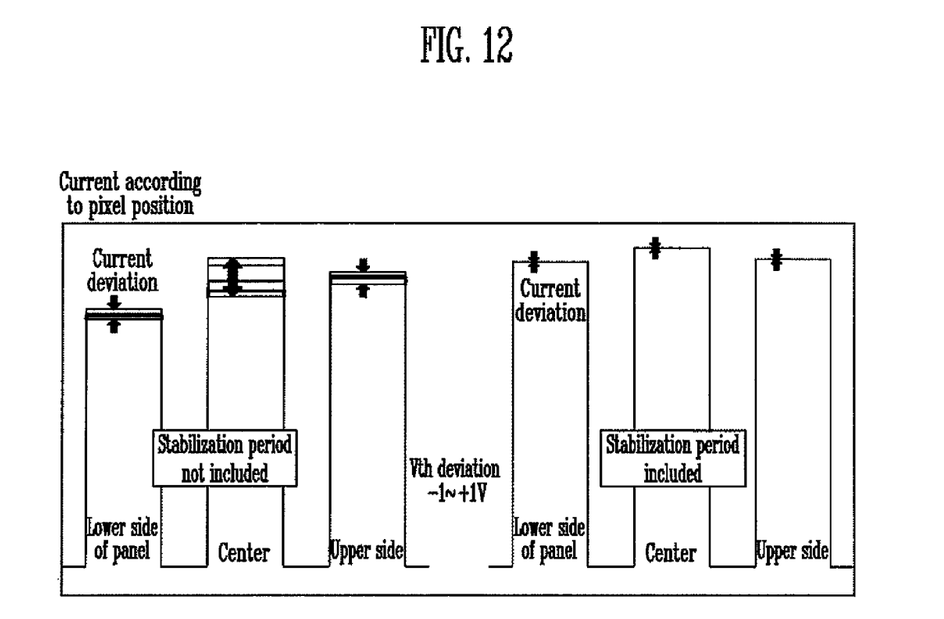
FIG. 12 is a view illustrating electric current variation corresponding to different pixel positions in response to the driving waveforms of an embodiment of the present invention.

Referring to FIGS. 10 and 11, when the stabilization period is included, the second voltage Vdrain of the second transistor M2 is set to the same voltage as that of the first voltage ELVDD(H) during the stabilization period, so the voltage change of the second node N2 caused by the leakage current can be prevented. FIG. 12 is a view illustrating electric current variation corresponding to different pixel positions in response to the driving waveforms of an embodiment of the present invention. When the stabilization period is included, the current variation (or current deviation) is reduced or minimized regardless of positions (the lower side, the central position, and the upper side of a panel) of the pixels 140 as illustrated in FIG. 12, so that an image with uniform brightness can be displayed.

Figure 13:
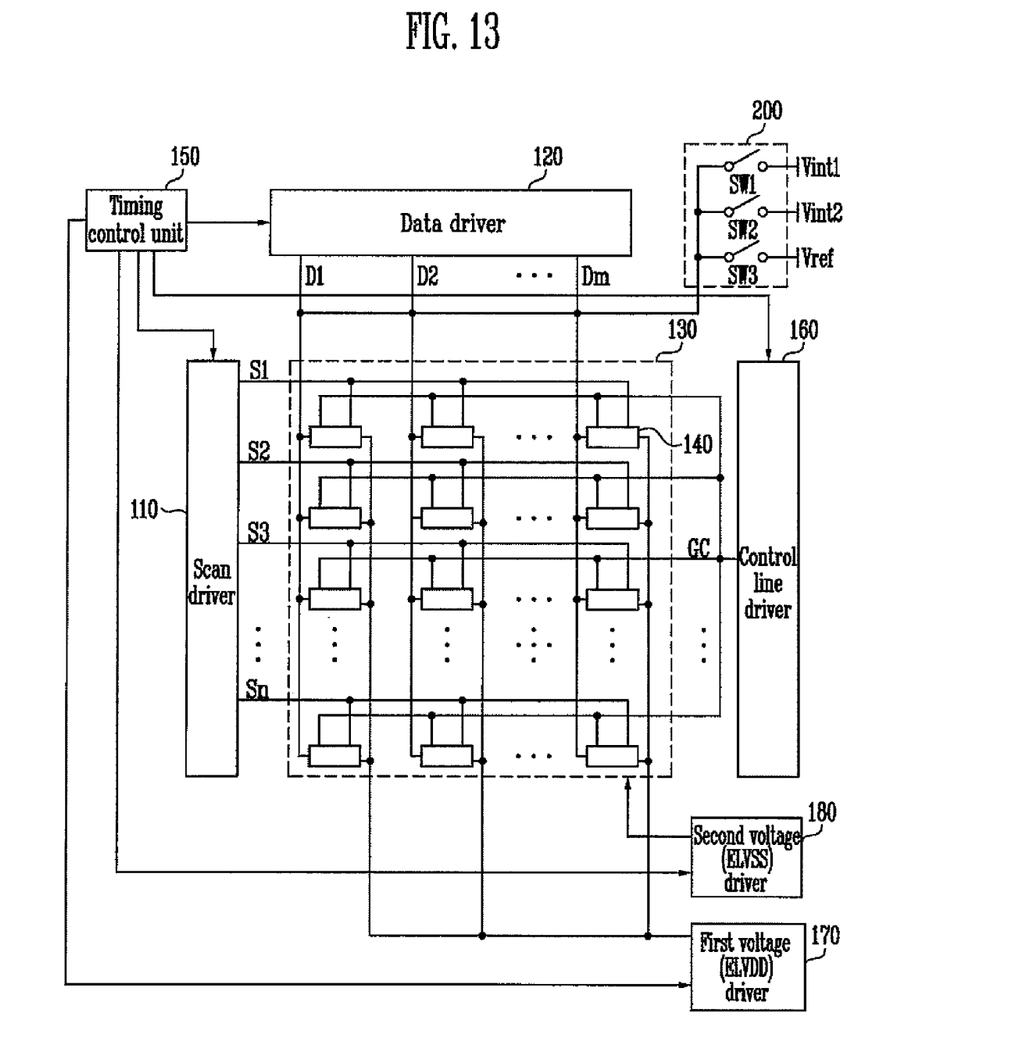
FIG. 13 is a schematic view illustrating an organic light emitting display device according to another embodiment of the present invention.

FIG. 13 is a schematic view illustrating an organic light emitting display device according to another embodiment of the present invention. With respect to FIG. 13, same reference numerals designate similar elements as those in FIG. 1, and their descriptions will not be repeated.

Referring to FIG. 13, the organic light emitting display device further includes a switching unit 200 coupled to the data lines D1 to Dm. The switching unit 200 supplies at least one of the first initialization voltage Vint1, the second initialization voltage Vint2, or the reference voltage Vref to the data lines D1 to Dm. To this end, the switching unit 200 includes a first switch SW1, a second switch SW2, and a third switch SW3.

The first switch SW1 is coupled between the data lines D1 to Dm and the first initialization voltage Vint1. The first switch SW1 is turned on for some of the initialization period (as illustrated in FIG. 6) to supply the voltage of the first initialization voltage Vint1 to the data lines D1 to Dm.

The second switch SW2 is coupled between the data lines D1 to Dm and the second initialization voltage Vint2. The second switch SW2 is turned on for some of the stabilization period (as illustrated in FIG. 6) to supply the voltage of the second initialization voltage Vint2 to the data lines D1 to Dm.

The third switch SW3 is coupled between the data lines D1 to Dm and the reference voltage Vref. The third switch SW3 is turned on, for example, during the threshold voltage compensation period (and portions of other periods, as illustrated in FIG. 6) to supply the reference voltage Vref to the data lines D1 Dm.

The organic light emitting display device of FIG. 13 has a similar configuration to that of FIG. 1 except for the switching unit 200. The organic light emitting display device as shown in FIG. 1 supplies the first initialization voltage Vint1, the second initialization voltage Vint2, and the reference voltage Vref from the data driver 120, while the organic light emitting display device of FIG. 13 supplies the first initialization voltage Vint1, the second initialization voltage Vint2, and the reference voltage Vref using the switching unit 200. In FIG. 13, the data driver 120 may be idle for periods other than the scan period.

Throughout, while the illustrated transistors are depicted as PMOS transistors, the present invention is not limited thereto. In other embodiments, the transistors may be formed, for example, as NMOS transistors.

In addition, the different OLEDs may produce red, green, and blue light in response to the amount of current supplied from the driving transistors but the present invention is not limited thereto. For example, in other embodiments, the OLEDs may produce white light in response to the amount of current supplied from the driving transistors. In this case, additional color filters may be used to implement color images.

In general, organic light emitting display devices are classified into passive matrix type (PMOLED) and active matrix type (AMOLED) according to a method of driving the OLEDs. Active matrix organic light emitting display devices include a plurality of scan lines, a plurality of data lines, a plurality of power lines, and a plurality of pixels coupled to these lines and arranged in a matrix form. Each of the pixels generally includes an OLED, a driving transistor for controlling the amount of current to supply to the OLED, a switching transistor for transmitting a data signal from a corresponding one of the data lines to the driving transistor, and a storage capacitor for maintaining a voltage of the data signal.

Active matrix organic light emitting display devices have small power consumption but may experience a variation between pixels in the amount of current flowing through the organic light emitting devices due to the voltage difference between the gate electrode and the source electrode of the driving transistors, that is, the difference between the threshold voltages of the driving transistors, resulting in unevenness in the display between different pixels. Since the transistors provided in the pixels vary in their properties according to a manufacturing factor, there is a threshold voltage difference of the driving transistors between the pixels. To help overcome this unevenness between the pixels, a compensation circuit capable of compensating the threshold voltage of the driving transistor is added each of the pixels.

However, the compensation circuit may include a plurality of additional circuits, such as transistors and capacitors, along with one or more signal lines for controlling the transistors. Thus, the pixels including the compensation circuit may experience a reduced aperture ratio and increased possibility of error (for example, manufacturing error) occurrence. Accordingly, in embodiments of organic light emitting display devices and methods of driving the organic light emitting display devices according to the present invention, the pixels may respectively include only three transistors and two capacitors, and that may compensate the threshold voltage of the driving transistors stably. In addition, a stabilization period is added to equalize the voltages of the first electrode and the second electrode of each of the driving transistors to the same voltage so that the voltage change of the gate electrode of the driving transistor caused by the leakage current through the driving transistors can be prevented or reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. An organic light emitting display device comprising:
a scan driver configured to supply scan signals to scan lines concurrently during a first period of a single frame and progressively during a second period of the single frame;
a data driver configured to supply data signals to data lines in synchronization with the scan signals progressively supplied to the scan lines during the second period;
pixels coupled to the scan lines and the data lines;
a first voltage driver configured to supply a first voltage varying between a low-level first voltage and a high-level first voltage to the pixels during the single frame; and
a second voltage driver configured to supply a second voltage varying between a low-level second voltage and a high-level second voltage to the pixels during the single frame,
wherein the first period is divided into an initialization period, a threshold voltage compensation period, and a stabilization period, and
wherein the data driver is configured to supply
a first initialization voltage to the data lines for some of the initialization period,
a reference voltage that is higher than the first initialization voltage to the data lines during the threshold voltage compensation period, and
a second initialization voltage that is lower than the reference voltage to the data lines for some of the stabilization period.

2. The organic light emitting display device as claimed in claim 1, wherein the first voltage driver is further configured to supply the low-level first voltage during the initialization period and to supply the high-level first voltage during the threshold voltage compensation period, the stabilization period, and the second period.

3. The organic light emitting display device as claimed in claim 2, wherein the second voltage driver is further configured to supply the low-level second voltage during a third period of the single frame and the high-level second voltage during the first period and the second period.

4. The organic light emitting display device as claimed in claim 1, wherein the first initialization voltage is a voltage that turns on a driving transistor included in each of the pixels.

5. The organic light emitting display device as claimed in claim 1, wherein the second initialization voltage is a voltage corresponding to one of the data signals of a maximum gray level.

6. The organic light emitting display device as claimed in claim 1, further comprising a control line driver configured to supply a control signal to control lines for some of the threshold voltage compensation period, the control lines being commonly coupled to the pixels.

7. The organic light emitting display device as claimed in claim 6, wherein each of the pixels comprises:
an organic light emitting diode (OLED);
a driving transistor configured to control an amount of current to supply to the OLED;
a second capacitor comprising a first terminal coupled to a gate electrode of the driving transistor;
a first transistor coupled between a second terminal of the second capacitor and a corresponding one of the data lines, and configured to turn on when a corresponding one of the scan signals is supplied to a corresponding one of the scan lines during the second period;
a third transistor coupled between an anode electrode of the OLED and the gate electrode of the driving transistor, and configured to turn on when the control signal is supplied to a corresponding one of the control lines; and
a first capacitor coupled between the second terminal of the second capacitor and the first voltage driver.

8. An organic light emitting display device, comprising:
a scan driver configured to supply scan signals to scan lines concurrently during a first period of a single frame and progressively during a second period of the single frame;
a data driver configured to supply data signals to data lines in synchronization with the scan signals progressively supplied to the scan lines during the second period;
pixels coupled to the scan lines and the data lines;
a first voltage driver configured to supply a first voltage varying between a low-level first voltage and a high-level first voltage to the pixels during the single frame;
a second voltage driver configured to supply a second voltage varying between a low-level second voltage and a high-level second voltage to the pixels during the single frame; and
a switching unit coupled to the data lines,
wherein the first period is divided into an initialization period, a threshold voltage compensation period, and a stabilization period, and
wherein the switching unit is configured to supply
a first initialization voltage to the data lines for some of the initialization period,
a reference voltage that is higher than the first initialization voltage to the data lines during the threshold voltage compensation period, and
a second initialization voltage that is lower than the reference voltage to the data lines for some of the stabilization period.

9. The organic light emitting display device as claimed in claim 8, wherein the switching unit comprises:
a first switch coupled between the data lines and the first initialization voltage;
a second switch coupled between the data lines and the reference voltage; and
a third switch coupled between the data lines and the second initialization voltage.

10. A method of driving an organic light emitting display device, the method comprising:
compensating threshold voltages of driving transistors included in respective pixels while concurrently supplying scan signals to scan lines;
lowering voltages of gate electrodes of the driving transistors and equalizing voltages of first electrodes and second electrodes of the driving transistors after the compensating of the threshold voltages;
transmitting data signals to the pixels while progressively supplying the scan signals to the scan lines; and
emitting light concurrently from the pixels in response to gray levels of the data signals.

11. The method as claimed in claim 10, wherein the equalizing of the voltages comprises supplying an initialization voltage to data lines to lower the voltages of the gate electrodes of the driving transistors.

12. The method as claimed in claim 11, wherein the initialization voltage corresponds to one of the data signals of a maximum gray level.

* * * * *